INVENTORS.
JAMES W. HALTERMAN
HOWARD L. HOKE

Oct. 7, 1969    J. W. HALTERMAN ET AL    3,470,916
GAS CLAMP WITH INSIDE SPANNER

Original Filed May 20, 1965                          2 Sheets-Sheet 2

INVENTORS.
JAMES W. HALTERMAN
HOWARD L. HOKE

United States Patent Office 3,470,916
Patented Oct. 7, 1969

3,470,916
GAS CLAMP WITH INSIDE SPANNER
James W. Halterman, Salamanca, N.Y., and Howard L. Hoke, Bradford, Pa., assignors to Dresser Industries, Inc., Dallas, Tex., a corporation of Delaware
Continuation of application Ser. No. 457,425, May 20, 1965. This application Nov. 4, 1968, Ser. No. 774,585
Int. Cl. F16l 55/16
U.S. Cl. 138—99                                6 Claims

ABSTRACT OF THE DISCLOSURE

A pipe repair clamp for repairing gas mains formed of an encircling gasket about which is contained a band separated at its ends by a gap at which the band can be drawn together for tightening the gasket against a contained pipe. A spanner member is supported bridging the gap between the band ends and a gasket support on the inner face of the gasket is located to extend spanning a radial alignment with each circumferential edge termination of the spanner.

---

This is a continuation of application Ser. No. 457,425, filed May 20, 1965 and now abandoned.

The present invention has to do with pipe repair clamps and is concerned primarily with a clamp designed for use on gas mains.

A pipe repair clamp of the type with which this invention is concerned has now assumed a fairly standardized and conventional form. It consists essentially of a flexible metallic band having ends in spaced relation defining a gap. The inner face of this band carries a gasket, the ends of which meet in a butt joint. Thus, the gasket encompasses a full 360°. A lug assembly is secured to each end of the band and these lugs are drawn together by nuts and bolts to tighten the band and compress the gasket about the pipe.

From the very nature of the clamping operation, it is essential that this gap be present to permit drawing the ends together to achieve the tightening operation. In order to accomodate pressure of the line content and prevent the gasket from blowing out of the gap, a spanner has been provided which bridges the gap. This spanner is located on the outer side of the gasket and is secured to one end of the band.

If a repair clamp of the character aforesaid is to be used on a gas main it is important that definite assurance be had against gas leaking out at the gap. Ofttimes, the break is a full break resulting in separated ends and this or other conditions might be created which result in the gasket not being properly compressed at the edges of the outside spanner. The areas immediately inside the edges of the outside spanner constitute the critical or key conditions. If the gasket is adequately compressed over these areas, an effective seal will be created which prevents the escape of gas regardless of where the leak might be located. Thus, even should gas escape to the space between the gasket and band at some other point, an effective seal at the edges of the spanner will prevent further escape.

With the foregoing conditions in mind, the present invention has in view as its foremost objective the provision of a repair clamp of the type aforesaid which includes a gasket supporting element immediately inside the gasket over the area at each edge of the outer spanner. Such a gasket support engages the pipe and receives backing from the latter so that as the flexible band is tightened the gasket is compressed between the support and across spanner edge.

A further more detailed object of the invention is to provide, in a pipe repair clamp of the character indicated, a gasket support across each edge of the spanner which is carried by the gasket on its inner face.

As pointed out above the important factor is that the gasket be compressed at each edge of the spanner. Thus, a single support of sufficient extent to bridge the gap and support the gasket at both the key zone or separate supporting elements may be utilized.

Various other more detailed objects and advantages of the invention such as arise in connection with carrying out the above noted ideas in a practical embodiment will in part become apparent and in part be hereinafter stated as a description of the invention proceeds.

The invention therefore comprises a pipe repair clamp including a flexible band having ends spaced at a gap, means for drawing these ends together, a gasket carried by the band on its inner face and encompassing a full 360°, a spanner carried by the band in one end bridging the gap and a gasket supporting element carried by the gasket on its inner face at each edge of the spanner.

For a full and more complete understanding of the invention reference may be had to the following description and accompanying drawings, wherein.

Figure 1:
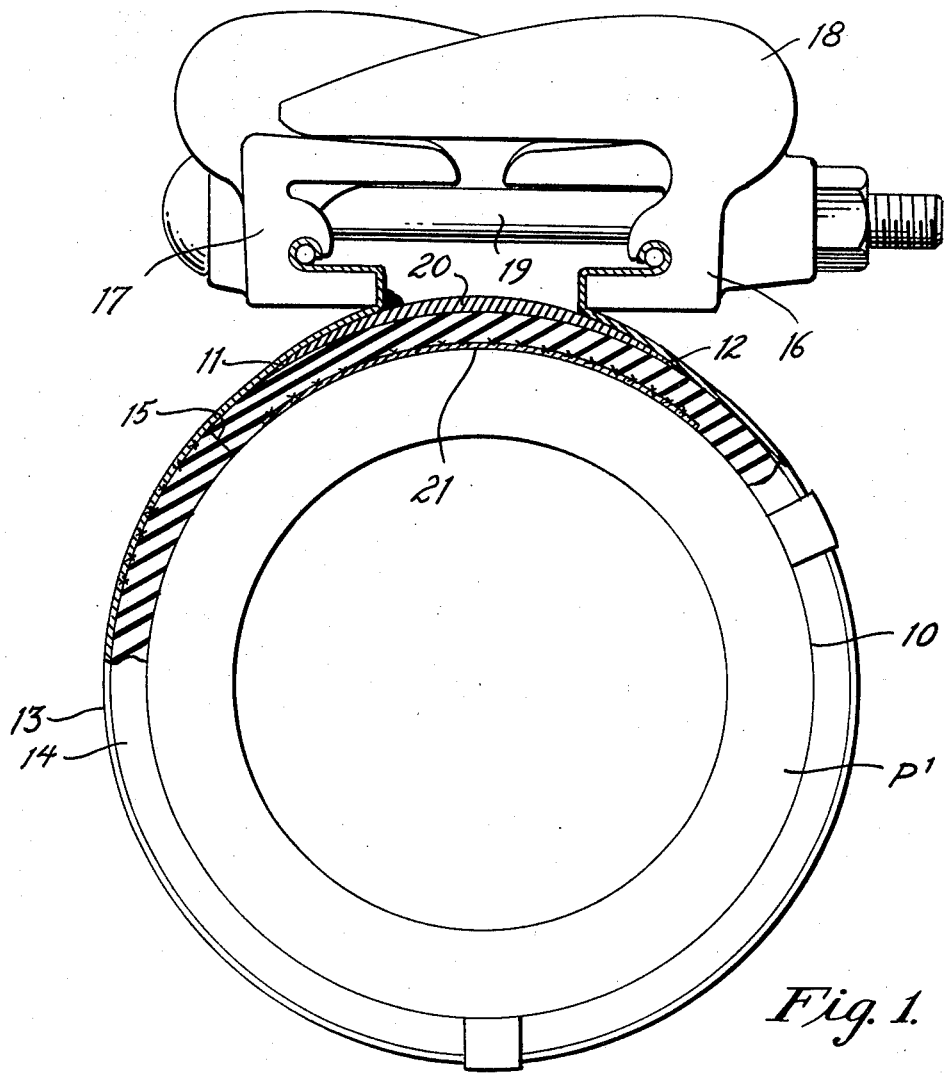
FIGURE 1 is a view taken on a transverse section through meeting pipe ends showing one pipe end in elevation and certain portions of the repair clamp in section, this view being taken about on the plane represented by the line 1—1 of FIGURE 2.
Figure 2:
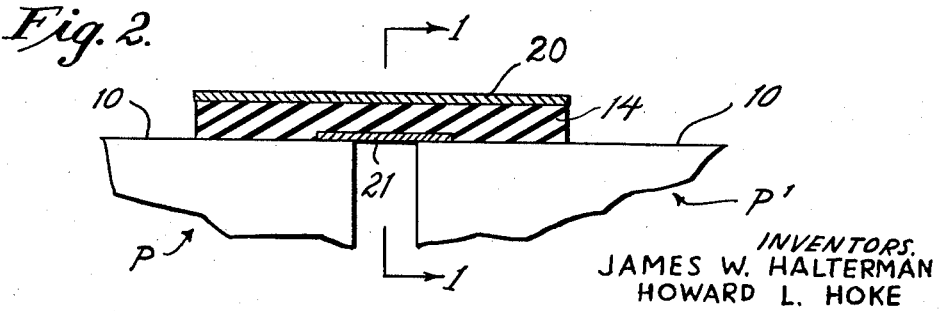
FIGURE 2 is a view taken normal to the showing of FIGURE 1 depicting the ends of a main at a break together with the gasket, the outer spanner, and the gasket supporting element.
Figure 3:
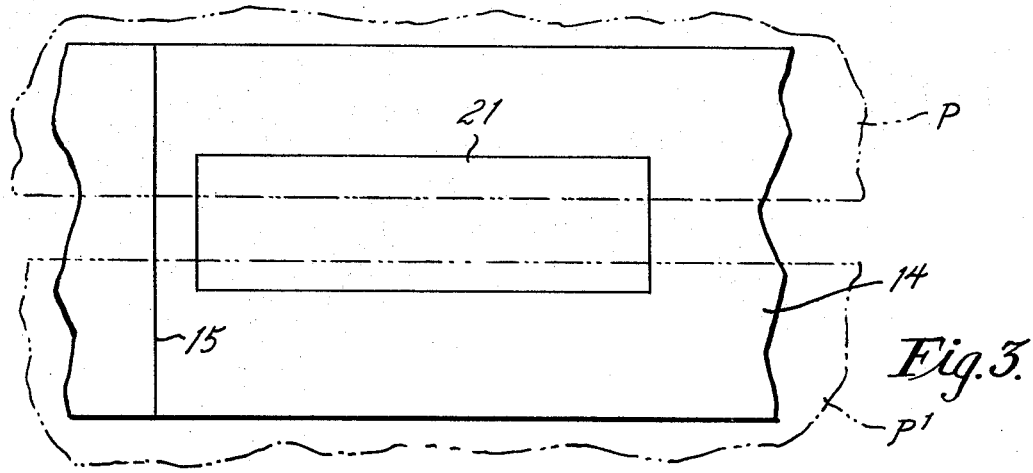
FIGURE 3 is a detailed perspective looking at the inner face of the gasket with the supporting elements shown as a single piece.

Referring now to the drawings and first more particularly to FIGURES 1 and 2, two sections of a gas main are shown at P and P'. These sections may be taken as representative of those created by a full break in the main or two ends which are to be joined by the clamp. In either case, the main sections P and P' present outer cylindrical surfaces 10.

The repair clamp is applied over these surfaces 10. It comprises a flexible metallic band 13 such as stainless steel and a gasket 14 of an appropriate packing material such as rubber or a comparable elastomer with the ends of the latter meeting at a butt joint shown at 15. This butt joint is preferably located adjacent to the gap at the meeting ends of the band 13 to facilitate application of the clamp about the pipe. While the gasket 14 is bonded to the inner face of the band 13 at least 50% of the engaging areas are left free and unbonded to permit relative movement which may be created when the clamp is tightened. Thus, the gasket with the butt joint adjusts to the pipe as it is tightened.

As shown in FIGURE 1 a lug assembly 16 is secured to one end of the band 13 and a second lug assembly 17 is secured to the other end of the band. Torque arms shown at 18 extend from each lug assembly and engaging bearing surfaces on the other two prevent rolling of the lugs and insure that the lugs move together with a straight rectilineal movement. Bolts 19 pass through aligned openings in the lug assemblies and are tightened to draw them together and thus, tighten the band to compress the gasket.

A spanner 20 is shown as bridging the gap between the band ends. This spanner ordinarily is secured to the inner face of one band end in any preferred manner as by welding or soldering.

Figure 4:
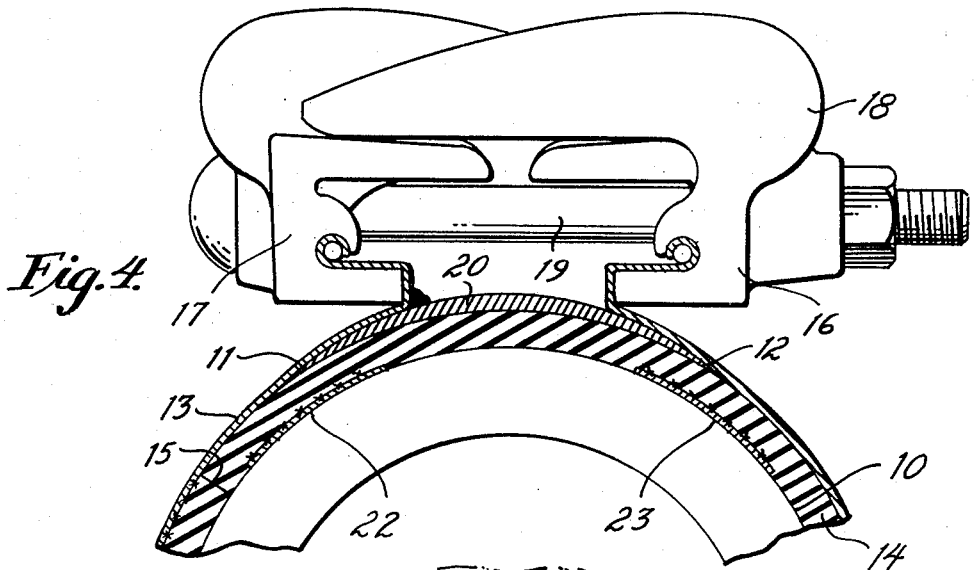
FIGURE 4 is a perspective similar to FIGURE 1 of a modified form including separate gasket supporting elements.
Figure 5:
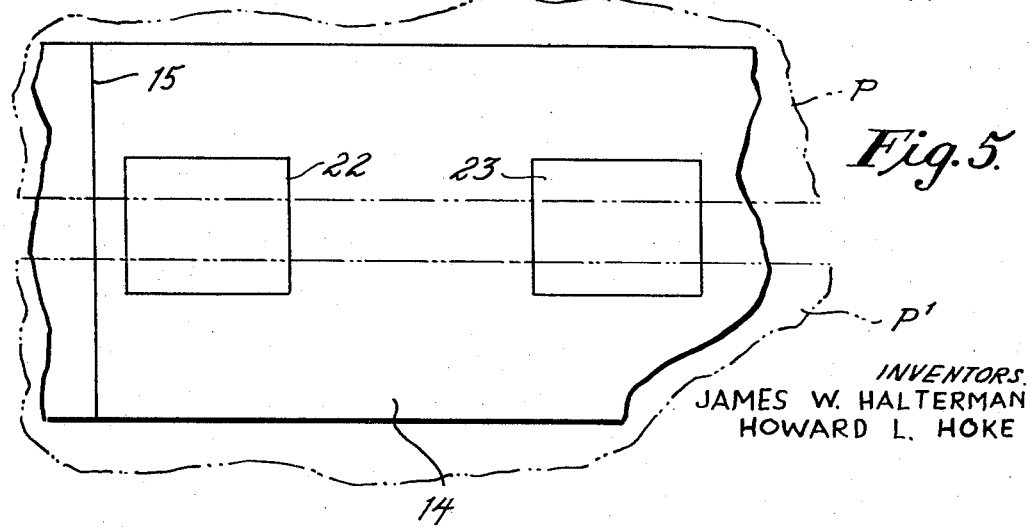
FIGURE 5 is a view similar to FIGURE 3 of the modification.

The spanner 20 has end edges designated 11 and 12. It is important and the very heart of the present invention that the gasket 14 be compressed at these end edges. One manner of achieveing this support is to employ a gasket supporting element 21 which is of sufficient extent to not only bridge the gap at the meeting ends of the band but to extend over and beyond the end edges 11 and 12. Another way is by employing individual gasket support elements such as shown at 22 and 23 in FIGURES 4 and 5. Thus, the supporting element 22 is inside the spanner edge 11 while the supporting element 23 is inside the spanner edge 12. The gasket supports 21, 22, and 23 may be of any material having sufficient strength and rigidity to provide the required supporting effects, metal being the preferred material.

In either case, when the clamp is tightened about the main, the gasket is effectively compressed at these edges 11 and 12 to create a seal which prevents gas from escaping at the gap.

While preferred specific embodiments of the invention are hereinbefore set forth, it is to be clearly understood that the invention is not to be limited to the exact constructions, mechanisms, and devices illustrated and described because various modifications of these details may be provided in putting the invention into practice within the purview of the appended claims.

In the claims:

1. In a pipe repair clamp designed for use on gas mains and including a flexible metallic band having spaced ends defining a gap, a gasket carried by said band on its inner face and encompassing a full 360°, a lug assembly carried by said band at each end, bolts and nuts for drawing said lug assembly together and a spanner secured to the inner face of one band end and bridging said gap, said spanner having end edges inside each band end, the improvement comprising gasket support means carried by said gasket on its inner face and having portions located spanning a radial alignment with each circumferential edge termination of said spanner.

2. The pipe repair clamp of claim 1 in which said gasket support is a single piece of sufficient extent to bridge said gap and provide the portions spanning said spanner end edges.

3. The pipe repair clamp of claim 1 in which the gasket support comprises separate supporting elements each being located spanning one of said spanner edges.

4. In a pipe repair clamp designed for use on pipe carrying combustible fluid and including a flexible metallic band having spaced ends defining a gap, a gasket carried by said band on its inner face and encompassing a full 360°, a lug assembly carried by said band at each end, bolts and nuts for drawing said lug assembly together and a spanner secured to the inner face of one band end and bridging said gap, said spanner having end edges inside each band end, the improvement comprising gasket support means carried by said gasket on its inner face and having portions located spanning a radial alignment with each circumferential edge termination of said spanner.

5. The pipe repair clamp of claim 4 in which said gasket support is a single piece of sufficient extent to bridge said gap and provide the portions spanning said spanner end edges.

6. The pipe repair clamp of claim 4 in which the gasket support comprises separate supporting elements each being located spanning one of said spanner edges.

References Cited

UNITED STATES PATENTS 3,173,450    3/1965    Halterman _____ 138—99

HERBERT F. ROSS, Primary Examiner